(12) United States Patent
Barth et al.

(10) Patent No.: US 9,010,101 B2
(45) Date of Patent: Apr. 21, 2015

(54) MULTIPLE ACCUMULATOR SYSTEMS AND METHODS OF USE THEREOF

(75) Inventors: Eric J. Barth, Nashville, TN (US); Alexander V. Pedchenko, Nolensville, TN (US); Wayne J. Book, Atlanta, GA (US)

(73) Assignee: Vanderbilt University, Nashville, TN (US)

( * ) Notice: Subject to any disclaimer, the term of this patent is extended or adjusted under 35 U.S.C. 154(b) by 629 days.

(21) Appl. No.: 13/360,929

(22) Filed: Jan. 30, 2012

(65) Prior Publication Data

US 2012/0211112 A1     Aug. 23, 2012

Related U.S. Application Data

(60) Provisional application No. 61/439,128, filed on Feb. 3, 2011.

(51) Int. Cl.
| | | |
|---|---|---|
| *F16D 31/02* | (2006.01) | |
| *F01B 7/02* | (2006.01) | |
| *F01B 19/00* | (2006.01) | |
| *F15B 1/02* | (2006.01) | |
| *F15B 1/04* | (2006.01) | |

(52) U.S. Cl.
CPC ... *F15B 1/02* (2013.01); *F15B 1/04* (2013.01); *F15B 2201/22* (2013.01); *F15B 2201/405* (2013.01); *Y02E 60/15* (2013.01)

(58) Field of Classification Search
CPC .......... F15B 1/02; F15B 1/04; F15B 2201/22
USPC .......... 60/413, 414, 416, 473, 476; 92/75, 90, 92/50; 138/30
See application file for complete search history.

(56) References Cited

U.S. PATENT DOCUMENTS

| | | |
|---|---|---|
| 315,453 A | 4/1885 | Waddell |
| 2,337,771 A | 12/1943 | Roberts |
| 2,401,791 A | 6/1946 | Overbeke |

(Continued)

FOREIGN PATENT DOCUMENTS

| | | |
|---|---|---|
| CN | 1081746 A | 2/1994 |
| CN | 1871439 A | 11/2006 |

(Continued)

OTHER PUBLICATIONS

Pourmovahed, A., Baum, S.A., Fronczak, F.J., and Beachley, N.H., "Experimental Evaluation of Hydraulic Accumulator Efficiency With and Without Elastomeric Foam". Journal of Propulsion and Power, vol. 4(2), Mar.-Apr. 1988, pp. 185-192.

(Continued)

*Primary Examiner* — Edward Look
*Assistant Examiner* — Daniel Collins
(74) *Attorney, Agent, or Firm* — Wyatt, Tarrant & Combs, LLP (57) ABSTRACT

The invention is an accumulator system in which multiple elastomeric accumulators are attached in series or parallel in order to generate total differential pressure in excess of that generated in a non-series system. Also disclosed is a "stacked" accumulator system. The system stores energy when the accumulators deform from their original shape in response to the flow of a pressurized fluid. The stored energy is available for use when the fluid is released from the accumulators and the accumulators return to their original shape.

13 Claims, 11 Drawing Sheets

(56) References Cited

U.S. PATENT DOCUMENTS

| | | |
|---|---|---|
| 2,721,580 A | 10/1955 | Greer |
| 3,142,318 A | 7/1964 | Mercier |
| 3,148,706 A | 9/1964 | Mercier |
| 3,162,213 A | 12/1964 | Peters |
| 3,230,975 A | 1/1966 | Mercier |
| 3,353,606 A | 11/1967 | Dyer |
| 3,473,565 A * | 10/1969 | Blendermann ............... 137/593 |
| 3,581,774 A | 6/1971 | Oeland, Jr. et al. |
| 3,625,242 A * | 12/1971 | Ostwald ........................ 138/30 |
| 3,632,557 A | 1/1972 | Brode et al. |
| 3,791,557 A | 2/1974 | Venus, Jr. |
| 3,797,516 A | 3/1974 | Forster et al. |
| 3,907,000 A | 9/1975 | Carr |
| 3,920,047 A | 11/1975 | Mercier |
| 3,933,172 A | 1/1976 | Allen |
| 3,946,759 A | 3/1976 | Mercier |
| 4,162,692 A | 7/1979 | Greer et al. |
| 4,206,908 A | 6/1980 | Mercier |
| 4,315,562 A | 2/1982 | Tangorra et al. |
| 4,333,553 A | 6/1982 | Hoppie et al. |
| 4,364,416 A | 12/1982 | Jacobellis et al. |
| 4,413,652 A | 11/1983 | Allewitz |
| 4,427,028 A | 1/1984 | Jacobellis |
| 4,448,217 A | 5/1984 | Mercier |
| 4,479,356 A | 10/1984 | Gill |
| 4,509,557 A | 4/1985 | Sugimura |
| 4,520,840 A | 6/1985 | Michel |
| 4,533,067 A | 8/1985 | Sansevero, Jr. et al. |
| 4,651,781 A | 3/1987 | Kandelman |
| 4,741,155 A | 5/1988 | McCarty |
| 4,751,155 A | 6/1988 | Binder et al. |
| 4,793,381 A | 12/1988 | Sugimura |
| 5,152,455 A | 10/1992 | Palmers |
| 5,405,409 A | 4/1995 | Knoth |
| 5,456,787 A | 10/1995 | Myles |
| 5,511,759 A | 4/1996 | DeKraker et al. |
| 5,655,569 A | 8/1997 | Tackett |
| 5,671,884 A | 9/1997 | Restive |
| 5,682,923 A | 11/1997 | Goloff et al. |
| 5,709,248 A | 1/1998 | Goloff |
| 5,755,361 A | 5/1998 | Restive et al. |
| 5,806,705 A | 9/1998 | Herald, Jr. et al. |
| 5,814,064 A | 9/1998 | Daniel et al. |
| 5,857,618 A | 1/1999 | Restive |
| 5,938,116 A | 8/1999 | Restive et al. |
| 5,984,199 A | 11/1999 | Restive |
| 6,007,582 A | 12/1999 | May |
| 6,071,460 A | 6/2000 | Renaudin et al. |
| 6,200,114 B1 | 3/2001 | Brighton et al. |
| 6,267,147 B1 | 7/2001 | Rago |
| 6,336,467 B1 | 1/2002 | Schneider |
| 6,564,830 B1 | 5/2003 | Smith |
| 6,877,965 B2 | 4/2005 | McCall et al. |
| 7,000,806 B2 | 2/2006 | Py et al. |
| 7,306,006 B1 * | 12/2007 | Cornell .................... 137/565.01 |
| 7,841,432 B2 | 11/2010 | Lynn et al. |
| 7,913,791 B2 | 3/2011 | Rose et al. |
| 8,201,582 B2 | 6/2012 | Stroganov et al. |
| 8,434,524 B2 | 5/2013 | Barth et al. |
| 2002/0002118 A1 | 1/2002 | Brandt |
| 2002/0153687 A1 | 10/2002 | Howard |
| 2005/0096171 A1 | 5/2005 | Brown et al. |
| 2006/0037658 A1 | 2/2006 | Shimbori et al. |
| 2007/0126284 A1 | 6/2007 | Swain et al. |
| 2008/0308168 A1 | 12/2008 | O'Brien, II et al. |
| 2009/0007980 A1 * | 1/2009 | Hall et al. .................... 138/126 |
| 2009/0165451 A1 | 7/2009 | Mueller et al. |
| 2011/0079140 A1 * | 4/2011 | Baseley ........................... 92/90 |
| 2012/0216900 A1 | 8/2012 | Liermann et al. |

FOREIGN PATENT DOCUMENTS

| | | |
|---|---|---|
| CN | 101331355 A | 12/2008 |
| DE | 1959030 | 5/1971 |
| DE | 2551580 A | 5/1977 |
| DE | 2551580 A | 5/1977 |
| EP | 0088739 A1 | 9/1983 |
| GB | 1207594 | 10/1970 |
| JP | 4630711 | 9/1971 |
| WO | WO2008045468 A1 | 4/2008 |
| WO | WO2010117853 A1 | 10/2010 |

OTHER PUBLICATIONS

Ashby, M.F., "Materials Selection in Mechanical Design", Pergamon Press, Oxford, 1992, 99. 32-35.

Pourmovahed, A., "Energy Storage Capacity of Gas-Charged hydraulic Accumulators". AIAA Thermophysics, Plasmadynamics and Lasers Conference, Jun. 27-29, 1988, San Antonio, TX pp. 1-11.

Pedchenko, A., and Barth, E., "Design and Validation of a High Density Elastic Accumulator Using Polyurethane", ASME 2009 Dynamic Systems and Control Conference, Hollywood, California, Oct. 12-14, 2009, vol. 1, pp. 283-290.

* cited by examiner

|  | Hydraulic Fluid Pressure (psi) | Maximum Stress in Bladder Material (psi) | Maximum Strain in Bladder Material (%) |
| --- | --- | --- | --- |
| Thin-walled bladder | ≈ 40 | ≈ 4100 | ≈ 170 |
| Thick-walled bladder | ≈ 350 | ≈ 3100 | ≈ 140 |

MULTIPLE ACCUMULATOR SYSTEMS AND METHODS OF USE THEREOF

This application claims the benefit of U.S. Provisional Patent Application Ser. No. 61/439,128, filed Feb. 3, 2011, entitled "Multiple Accumulator Systems and Methods of Use Thereof" which is hereby incorporated by reference in its entirety.

STATEMENT REGARDING FEDERALLY SPONSORED RESEARCH OR DEVELOPMENT

This invention was made, in part, with Government support under grant number 0540834, awarded by the National Science Foundation's Engineering Research Center for Compact and Efficient Fluid Power. The United States Government has certain rights in this invention.

REFERENCE TO A MICROFICHE APPENDIX

Not applicable

BACKGROUND OF THE INVENTION

One of the most pressing challenges in the design of an accumulator is the fabrication of a light weight and compact device that may be used in various industries. Hydraulic accumulators are energy storage devices commonly used to provide supplementary fluid power and absorb shock. One particularly interesting recent application of these devices is regenerative braking. Although a theoretically appealing concept, hydraulic regenerative braking is difficult to implement due to some major inherent limitations and non-ideal properties of conventional accumulators.

Currently available accumulators include gas bladder accumulators and piston accumulators with a gas pre-charge, each of which use gas for energy storage and, therefore, have greater gravimetric energy density than their spring piston counterparts. However, such accumulators present problems to be solved. In these accumulators, a gas, separated by a bladder or a piston, occupies a certain volume of a container which is otherwise filled with a fluid, typically hydraulic fluid. As fluid is forced into this container, the gas inside the separated volume is compressed and energy is stored in this compressed gas. Such accumulators are subject to two serious drawbacks: 1) inefficiency due to heat losses, and 2) gas diffusion through the bladder into the hydraulic fluid. The drawback of inefficiency via heat loss is perhaps addressable through an isothermalizer foam inserted inside the gas bladder, but the gas diffusion issues gives rise to high maintenance costs associated with "bleeding" the gas out of the fluid often.

What is needed is an accumulator that very efficiently stores energy within a very limited space. While doing so, such an accumulator must be light weight. Conventional accumulators fail to fully address these problems and fail to provide the needed features.

SUMMARY OF INVENTION

The present invention discloses several accumulator systems for storing hydraulic energy. The disclosed system provides a compact and space saving design. That is, the low pressure reservoir of the hydraulic system is combined into the same space as the high pressure accumulator. Use of multiple bladders for storing strain energy in a fluid based system provides the benefits of requiring less space and weight as compared to traditional accumulator systems. The several accumulator systems disclosed provide methods of storing strain energy in a fluid based system so that gas at a pressure greater than that of the fluid does not defuse into the fluid.

In certain embodiments, the accumulator system includes, a housing having a first end and a second end, a first bladder having a tubular configuration attached to the first end and the second end of the housing, a second bladder having a tubular configuration and a closed end, the second bladder being located within the first bladder and attached to the second end of the housing, a first conduit attached to the first end of the housing on the outside of the first bladder, a first switching valve attached to the first conduit, a pump/motor attached to the first switching valve, a second switching valve attached to the pump/motor, a second conduit attached to the second switching valve and attached to the second end of the housing at a position which is inside of the first bladder and outside of the second bladder, a third conduit attached to the first end of the housing at a position to the inside of the first bladder and attached to the first switching valve, and a fourth conduit attached to the second switching valve and attached to the second end of the housing at a position which is inside of the second bladder. In certain other embodiments, the system further includes a shaft attached to the pump/motor, and a motor attached to the shaft. In still other embodiments, the system further includes a fluid contained within the housing, first bladder, second bladder and each of the conduits. In certain embodiments, the first switching valve and the second switching valve are two position three way valves.

In other embodiments, the accumulator includes, a first bladder having a tubular configuration with two open ends, a second bladder stacked within the first bladder, the second bladder having a closed end and an open end, a housing having a first end and a second end, the housing surrounding the first bladder and second bladder, wherein the first end and the second end of the housing are attached to the open ends of the first bladder and wherein the second end of the housing is attached to the open end of the second bladder. In certain embodiments, the accumulator further includes a first switching valve operationally attached to the first end of the housing, a pump/motor operationally attached to the first switching valve, and a second switching valve operationally attached to the pump/motor and operationally attached to the second end of the housing. In other embodiments, the second bladder is a length of the housing. In still other embodiments, the first end and the second end of the housing each define a plurality of openings. In yet other embodiments, the accumulator further includes a fluid between each of the bladders and surrounding the bladders within the housing.

In still other embodiments, the accumulator system includes, a first accumulator, wherein the first accumulator has a low pressure side and a high pressure side, a second accumulator, wherein the second accumulator has a low pressure side and a high pressure side, wherein the low pressure side of the first accumulator is attached to the high pressure side of the second accumulator, and a pump/motor attached to the low pressure side of the second accumulator and the high pressure side of the first accumulator. In certain other embodiments, the accumulator system further includes a plurality of accumulators, wherein each of the plurality of accumulators has a low pressure side and a high pressure side, wherein each of the plurality of accumulators is operationally attached in a series configuration at a position between the low pressure side of the second accumulator and the pump/motor. In still other embodiments, the accumulator system further includes a third accumulator having a low pressure side and a high pressure side, and a fourth accumulator, wherein the fourth accumulator has a low pressure side and a high pressure side, wherein the low pressure side of the third accumulator is attached to the high pressure side of the fourth accumulator and the pump/motor is attached to the low pressure side of the fourth accumulator and the high pressure side of the third accumulator. In other embodiments, the present invention is a method of manufacturing an accumulator system having a desired working pressure and working volume of fluid, including, providing a plurality of accumulators, each accumulator having a low pressure side and a high pressure side, providing a pump/motor, attaching the pump/motor to the plurality of accumulators so that the plurality of accumulators are attached in series and in parallel, wherein each accumulator acts on a differential pressure between its high pressure side and its low pressure side, incorporating additional accumulators in series in order to increase the working pressure of the accumulator system, and incorporating additional accumulators in parallel in order to increase the working volume of the accumulator system.

Accordingly, one provision of the invention is to provide an accumulator system having a volumetrically and gravimetrically energy dense design.

Still another provision of the invention is to provide an accumulator system using multiple bladders for storing strain energy in a fluid based system.

BRIEF DESCRIPTION OF THE DRAWINGS

FIG. 8 is a schematic diagram of an embodiment of a "stacked" accumulator, as disclosed herein. Shown is a partially expanded outer bladder which is continuing to fill with working fluid. Also shown is the housing, inner bladder, conduits, switching valves and pump/motor.

FIG. 9 is a schematic diagram of the continued charging of the "stacked" accumulator shown in FIG. 8. Now, the outer bladder is fully expanded and the inner bladder is partially filled and continuing to fill with fluid. The arrows show the direction of flow of the working fluid during charging of the embodiment of the accumulator system.

FIG. 11 is a schematic diagram of the continued release of the stored energy from the embodiments of the "stacked" accumulator shown in FIG. 8. The inner bladder has forced its fluid out so that it has returned to its unstrained configuration. The outer bladder is partially expanded and is continuing to contract, thereby forcibly releasing the working fluid which is being used by the pump/motor to perform work through the shaft. The arrows show the direction of fluid flow.

DESCRIPTION OF THE PREFERRED EMBODIMENTS

This invention concerns a combined hydraulic accumulator and low pressure reservoir. This invention disclosure is to detail the way in which the hydraulic pressure within the accumulator can be made to exceed the yield stress of the bladder material. This is referred to as a series configuration. A parallel configuration is also described wherein the total volume of displaceable fluid can be specified for a given designable hydraulic pressure. Finally, a stacked configuration is also disclosed.

Disclosed herein are various arrangements of an accumulator device 10 which includes an elastic bladder 12 contained inside a rigid shroud 14. Hydraulic fluid 24 occupies the space inside the bladder 12 and outside the bladder 12 within the shroud 14. A feature of the device 10 is that the low pressure reservoir side 26 may either be open to atmospheric pressure, or sealed as part of a closed hydraulic system. If sealed, the accumulator/reservoir device 10 acts on the differential pressure between the high and low pressure sides as opposed to the gage pressure of the high pressure side. This "differential pressure" embodiment allows this device 10 to be combined either serially or in parallel with repeats of the device, or other hydraulic devices. For example, if the high pressure side is connected to a pump/motor 20 and the low pressure side is connected to the high pressure side of a second device 10 which in turn has its low pressure side connected back to the pump/motor 20, the two devices 10 combined in series in this manner will have a total differential pressure approximately twice that of each device 10 (assuming that both are identical). In the language of bond graphs, this example is a common flow configuration. A parallel configuration, where the pump/motor 20 feeds several devices 10 in parallel, is a common effort configuration. The common flow configuration (series) allows an arbitrary multiplication (dictated by the number of devices) of the total differential pressure across all devices included. The common effort configuration (parallel) allows an arbitrary multiplication (again dictated by the number of devices) of the flow through the device 10.

Figure 1A:
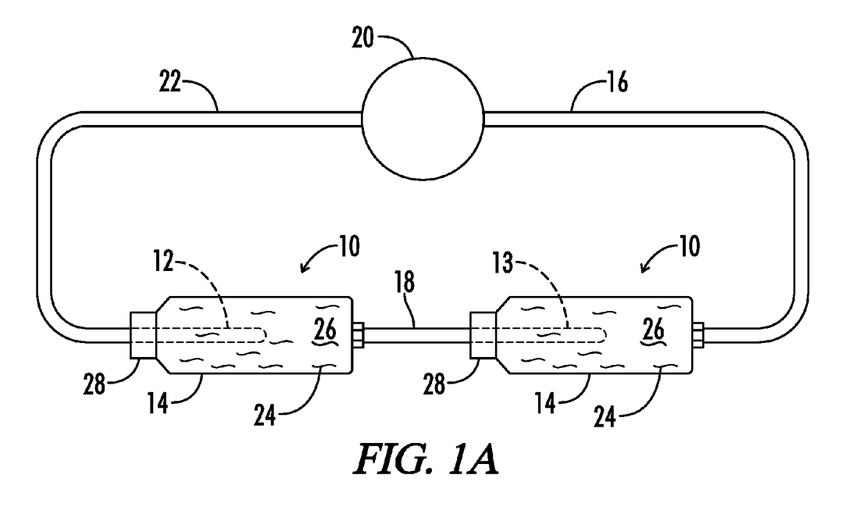
FIGS. 1A, 1B and 1C are schematic diagrams of embodiments of the present invention. Shown in FIG. 1A is a schematic diagram of an embodiment showing two accumulators arranged in series. Also shown are fluid conduits and the pump/motor. Shown in FIG. 1B is a schematic diagram of an embodiment of a plurality of accumulators arranged in parallel. Shown in FIG. 1C is a schematic diagram of an embodiment of a combined arrangement of accumulators in series and parallel.
Figure 1B:
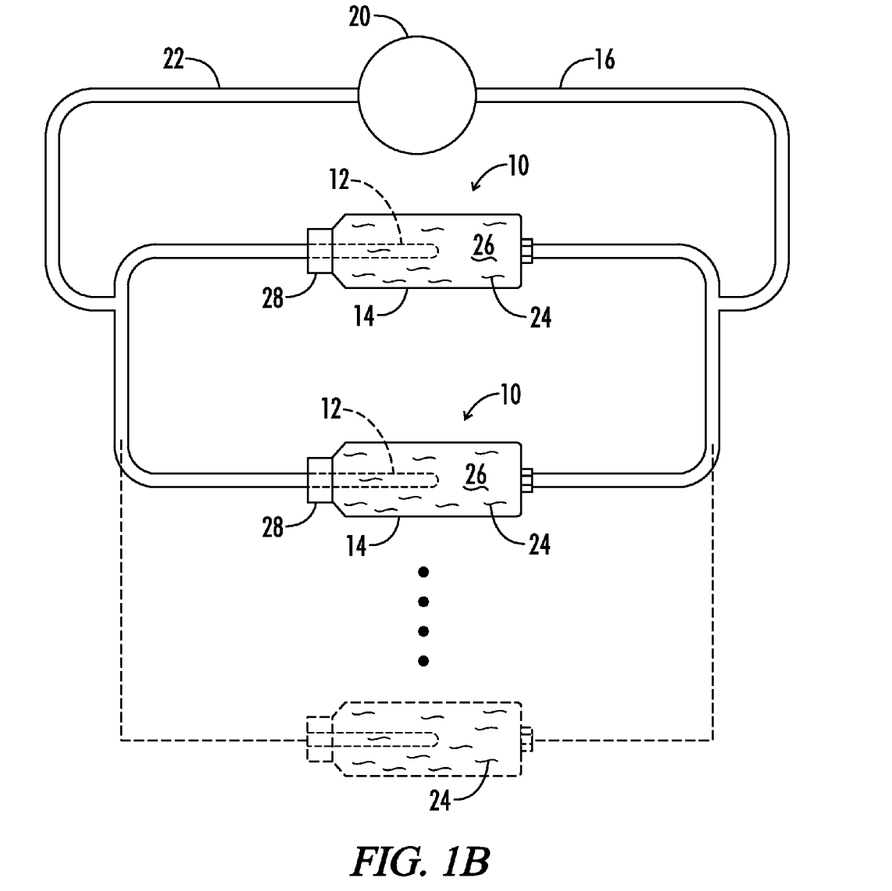
Figure 1C:
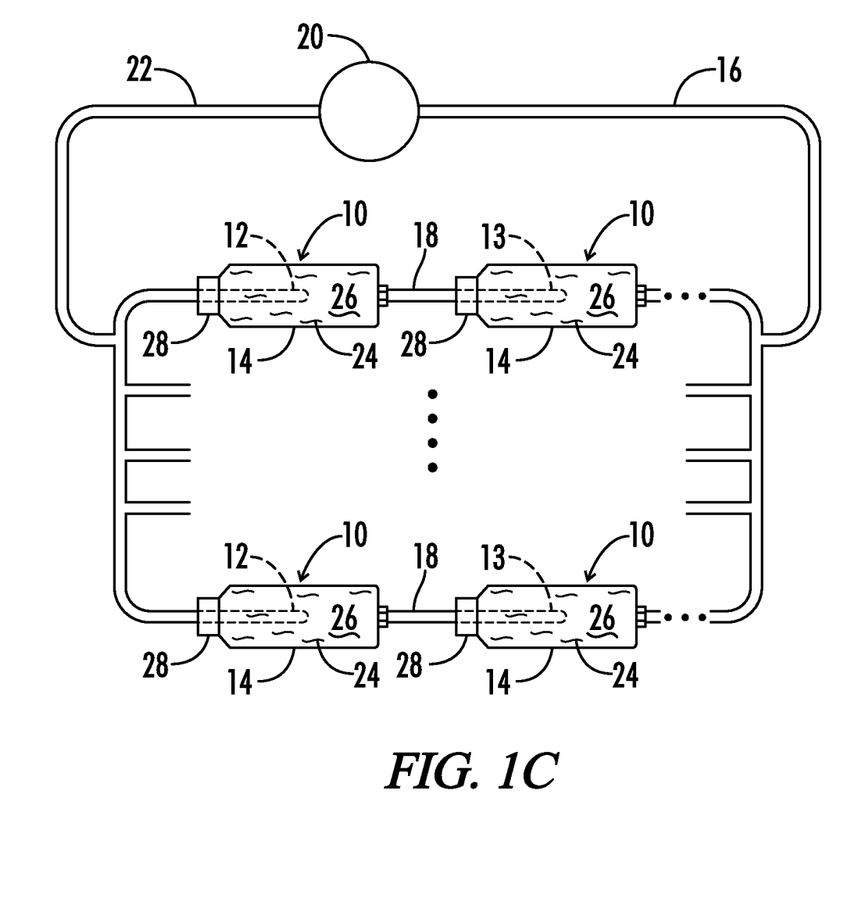

Referring now to FIG. 1A, there are shown elastic bladders 12 and 13, each contained inside a rigid shroud 14. Hydraulic fluid 24 occupies the space inside and outside of each bladder 12 and 13. In the example circuit shown, a hydraulic pump/motor 20 is shown connecting the low pressure side 26 of device 10 on the right to the high pressure side (inside the bladder) of device 10 on the left. Conduits 16, 18, 22 are also shown. Also shown is the seal 28 of each device 10, which may be used in certain embodiments. The seal 28 may provide a connection of the bladder 12 or 13 to the housing 14 and may have a threaded engagement, or the like, in order to provide a fluid tight junction. In other embodiments of the present invention, any bladder (12, 13, 114, or 116) may be directly or indirectly attached to any housing (14 or 112), as is well known to those of ordinary skill in the art. As further described herein, fluid 24 exists through out the entire system, although not shown in the conduits, pump/motor, or switching valves in FIGS. 1A-1C and 8-11. Regarding any of the fluid tight junctions described herein, connectors for providing such junctions are well known to those of ordinary skill in the art and the materials needed for the same are readily commercially available. Still referring to FIG. 1A, this example configuration is shown for an application such as regenerative braking whereby the pump/motor 20 is physically connected to the power-train of an automobile. When the pump/motor 20 is absorbing mechanical energy, it acts as a pump and moves hydraulic fluid 24 from the low pressure side 26 of device 10 on the right and into the high pressure side of device 10 on the left, stretching and increasing the volume in the bladders 12 and 13. Due to the relative incompressibility of the working fluid, the volume outside of bladder 12 is reduced by the same amount as the working fluid that is forced into bladder 13. When the pump/motor 20 acts as a hydraulic motor to deliver the energy stored in the bladders 12 and 13 (stored in the form of strain energy of the elastic material of the bladder) to shaft work at the output of the motor, the elastic bladders 12 and 13 force high pressure hydraulic fluid 24 through the motor from the high pressure side of the device 10 on the left to the low pressure side 26 of the device 10 on the right. As this occurs, the volume in the bladders 12 and 13 decreases at the same rate at all points in time as the volume of hydraulic fluid 24 increases outside the bladders 12 and 13 in the reservoir space 26. Not shown in the example configuration are other possible hydraulic machines either in series or in parallel with either the high pressure side or low pressure side of the pump/motor 20. Hydraulic actuators and valves are possibly connected to either the high or low pressure side as required. A small low pressure reservoir (of the conventional type) may also be connected as needed to the low pressure side—this for example would be needed to account for the asymmetric volume of fluid of a single-rodded hydraulic piston. FIG. 1B shows a parallel configuration. FIG. 1C shows a device that combines both series and parallel.

Figure 2:
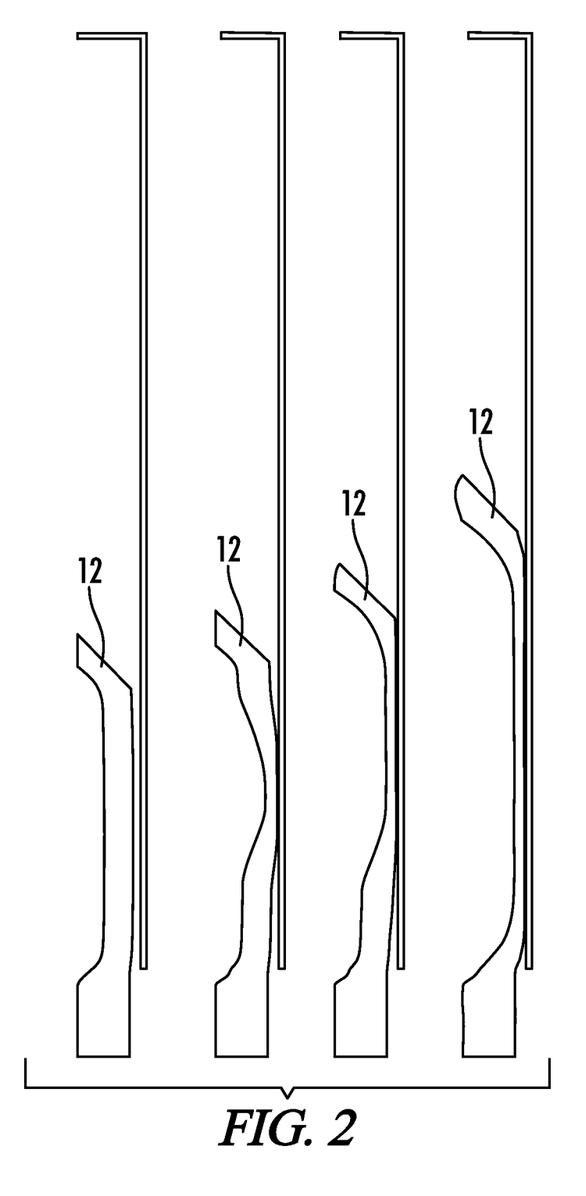
FIG. 2 is a diagram showing a series of cross sections of a portion of an embodiment of a bladder as it progressively expands due to the intake of fluid, as disclosed herein.

By way of background, with reference to FIG. 2, an axi-symmetric representation of device 10, there is shown four simulation frames showing the bladder's 12 reaction to the flow of fluid (fluid 24 is outside the bladder as shown in FIGS. 1A-1C) into its cavity during the charging process. The contours provide a qualitative check against the type of behavior observed during experimentation. The second frame from the left shows bubble formation and the frames to the right of it show progressive bubble propagation along the shroud. These simulation results increase model fidelity since they show the model to have the same bladder behavior as was physically observed.

By forcing fluid 24 into the bladder 12, it expands. The pressure inside the bladder 12 remains relatively constant after initial bubble formation. The extended portions of the bladder 12 tend to move from the initial aneurism along the axis of the shroud 14. Since the pressure is essentially constant, the area under the pressure-volume curve can be greater than conventional compressed gas accumulators. Additionally, the fluid 24 is a liquid, and therefore does not experience loss of energy characteristic to a quickly compressed gas cooling down to its ambient temperature. The energy is stored by straining an elastomeric material. The sizing of the material is optimized and the nominal thickness of the material, among other things, dictates the pressures necessary to expand the bladder 12. By way of background, toy balloons of a similar geometry exhibit a similar behavior.

Figure 3:
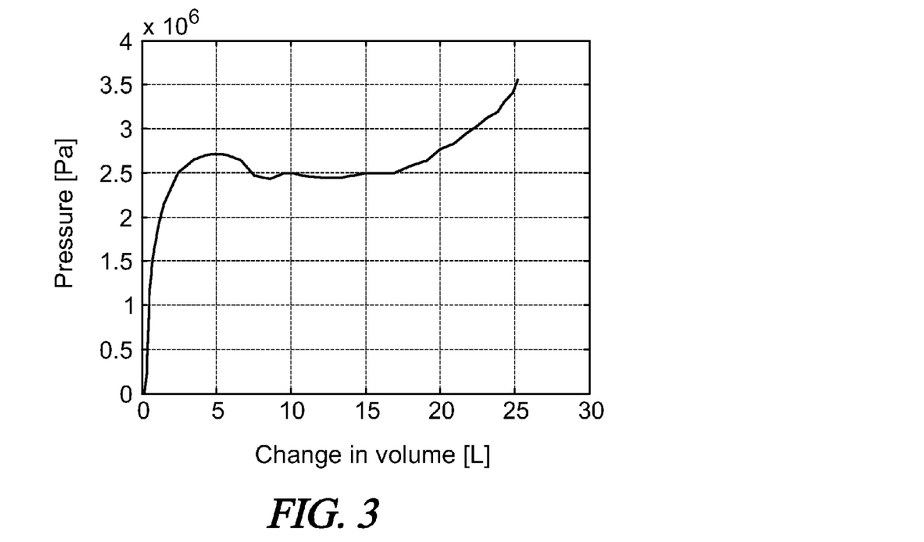
FIG. 3 is a diagram showing the performance of an embodiment of a bladder. Shown therein is the pressure charted against the change in volume.

Referring to FIG. 3, the accumulator's cavity's pressure and fill volume correlation is in good agreement with experimentally recorded data obtained during low pressure prototype testing (in terms of pressure-volume curve shape). The pressure increase seen during the later stages of inflation is due to additional working fluid 24 being forced into the accumulator after the bubble has propagated all the way through the bladder 12.

Unfortunately, even the with the unexpected pressure increase achieved by the accumulator towards the end of the inflation process, the operating pressure level of the accumulator resulted in unsatisfactory performance.

Figure 4:
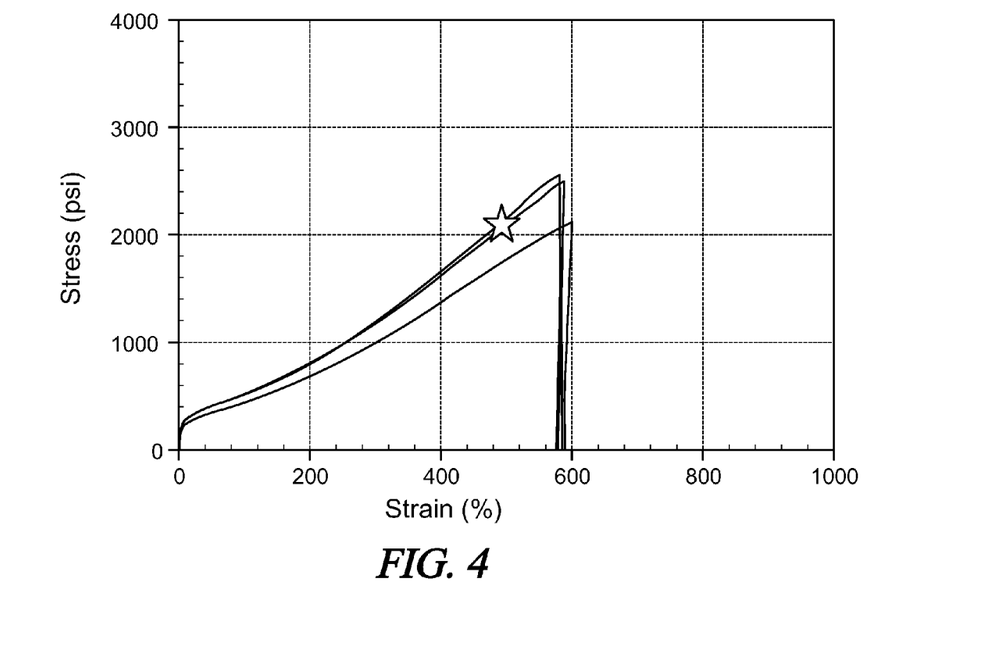
FIG. 4 shows three stress-strain curves for three samples of a material called NBR 6212, as further described herein.

Referring now to FIG. 4, the desired performance was based off of the uniaxial stress-strain curve of a nitrile rubber formulation NBR 6212. NBR 6212 is manufactured by the Gates Rubber Corporation of Denver, Colo., and is a material used for illustrative purposes. From the plot, it can be seen that if the material is strained to about 475% (about 125% short of its tensile limit), it would respond with about 13.7 MPa (2000 psi). Its volumetric strain energy density (area under the curve) given those conditions could then be estimated using the following expression—

$$\frac{1}{2} \cdot 4.75 \cdot 13.7 \text{ MPa} \approx 33 \text{ MJ/m}^3 \tag{1}$$

Using this as the material's volumetric energy density, to store the targeted 200 kJ of energy it would require about 6.1 L of material. To compare, the model results show that 18.8 L of NBR 6212 stored about 74.2 kJ, resulting in an effective volumetric energy density of 4 MJ/m³. Using this value, about 50 L of material would be required to store 200 kJ.

Figure 5:
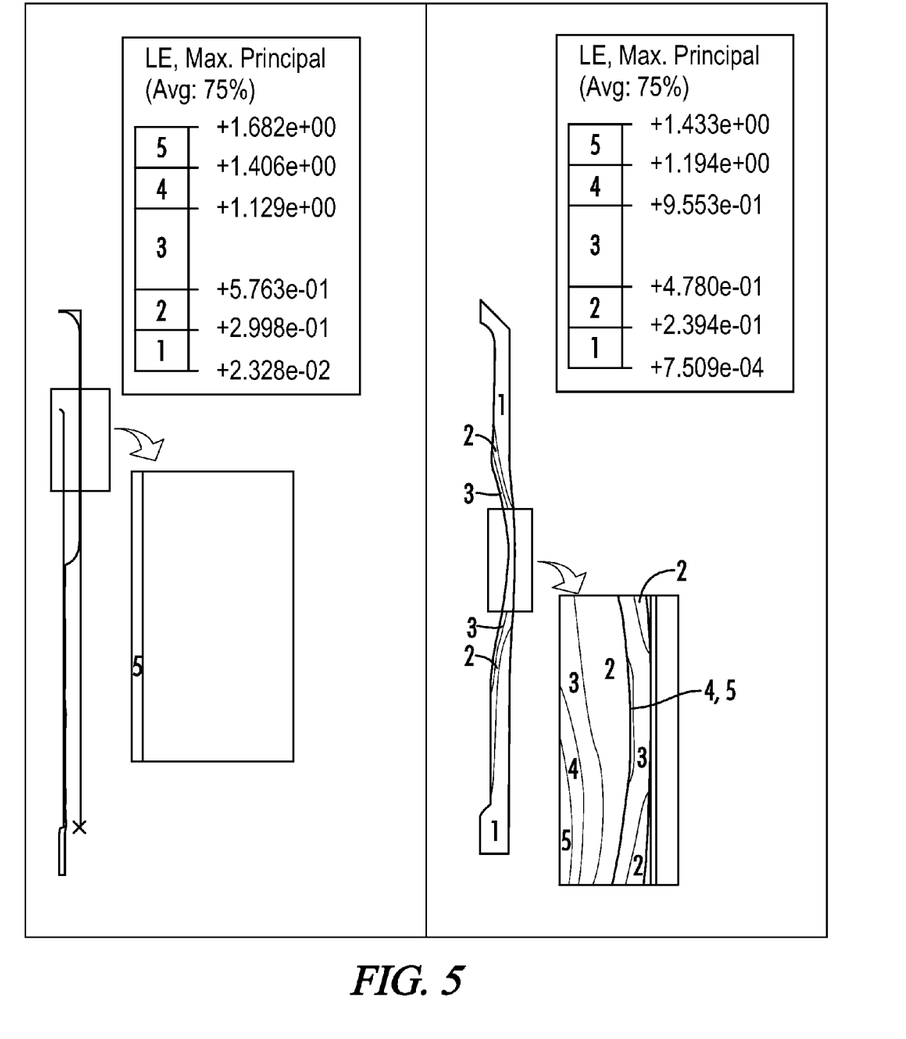
FIG. 5 shows a strain distribution comparison of embodiments of bladders of different thicknesses.

The poor performance of the modeled accumulator is due to a tradeoff between holding pressure and strain distribution which occurs in the single bladder elastomeric strain energy hydraulic accumulator design. FIG. 5 illustrated this tradeoff. When a thin-walled accumulator is charged, its constituent material is strained uniformly throughout the thickness of the bladder 12. Conversely, when a bladder 12 with a much larger wall thickness is filled, it exhibits a non-uniform strain distribution along its thickness. Since the accumulator is essentially an elastomeric pressure vessel, the equation for the hoop stress in a thick-walled cylindrical pressure vessel can be used to lend some insight:

$$\sigma_{hoop} = \frac{r_i^2 p}{r_o^2 \cdot r_i^2} \left( \frac{r_o^2}{R^2} + 1 \right) \tag{2}$$

where $r_i$ is the inside radius of the pressure vessel, $r_o$ is the outside radius, p is the pressure inside, and R is the radius of interest within the pressure vessel wall. From Equation 2 it can be seen that as R varies from $r_i$ to $r_o$, so does the hoop stress, and therefore, strain. The larger the range of R (i.e., thickness of pressure vessel), the more the strain can vary. This is the reason for the inverse relationship between bladder thickness and consistency of strain in the radial direction that is shown in FIG. 5. Since only a portion of the material comprising the thick-walled bladder can be stressed to a certain maximum stress, the bladder's overall energy density suffers.

Figure 6:
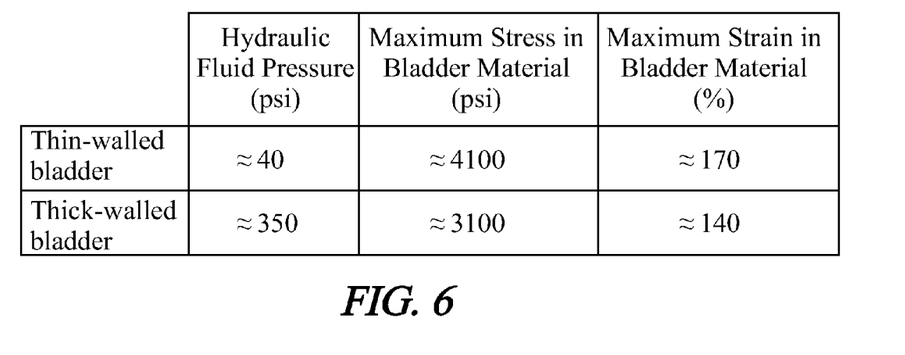
FIG. 6 is a chart summarizing characteristics of an embodiment of a thin-walled bladder and an embodiment of a thick-walled bladder.

However, simply reducing the wall thickness of the accumulator is not a feasible solution to the energy density problem. Although the reduction results in a more uniform strain distribution, it also severely compromises the extent to which the bladder 12 is capable of pressurizing its contained working fluid 24. FIG. 6 shows some key behavior response parameters for the thin and thick-walled bladders 12 shown in FIG. 5. The pressure exerted on the fluid 24 by the thicker of the two accumulators is almost an order of magnitude higher than that exerted by its thin-walled counterpart, while the latter actually experiences greater stress values within the material.

One method for addressing the undesirable tradeoff between the distribution of strain and the pressure to which bladder 12 can be pressurized is to connect bladders 12 and 13 in series, as shown in FIG. 1A. The setup functions on the same principle as the single bladder 12 accumulator. Working fluid 24 is forced into an elastomeric bladder 12, which resists expansion, thereby pressurizing the fluid 24 being transferred into it. However, whereas in a single device 10 system, the single bladder 12 provided the resistance to the volumetric expansion, in the series device 10 system, two bladders 12 and 13 are providing the resistance. This is achieved by taking advantage of the fact that bladder expansion occurs based on differential pressure (i.e., the driving mechanism is based on the difference between the pressure inside of each bladder 12 or 13 and the pressure surrounding each bladder 12 or 13).

As fluid 24 enters an embodiment having a single device 10, it flows into the first bladder 12. In order for bubble formation and appreciable energy storage to occur, the inside of the bladder 12 needs to see some pressure $P_{expan}$ greater than that which the outside of the bladder 12 is seeing. In an alternate embodiment having a series of devices 10, as best seen in FIG. 1A, the outside of the first bladder 12 in the series is surrounded by working fluid 24 which is in direct contact with the inside of a second bladder 13. Since the working fluid 24 and the bladders 12 and 13 are incompressible, for the first bladder 12 to expand, it needs to force the working fluid 24 into the second bladder 13, the outside of which is subjected to working fluid 24 at atmospheric pressure. The second bladder 13, in turn, also needs to see a pressure difference of $P_{expan}$ for bubble formation and subsequent energy storage to occur. Thus, the inside of the second bladder 13 in the series will need to reach a pressure of $$P_{2nd\_bubble} = P_{expan} + P_{atm} \quad (3)$$

to initiate energy storage through bubble propagation. In turn, for the first bladder 12 in the configuration to do the same, its inside pressure will need to reach $$P_{1st\_bubble} = P_{expan} + P_{2nd\_bubble} = 2 \cdot P_{expan} + P_{atm}$$

or almost double the pressure inside of the second bladder 12 because $P_{expan}$ will be much larger than $P_{atm}$.

Figure 7:
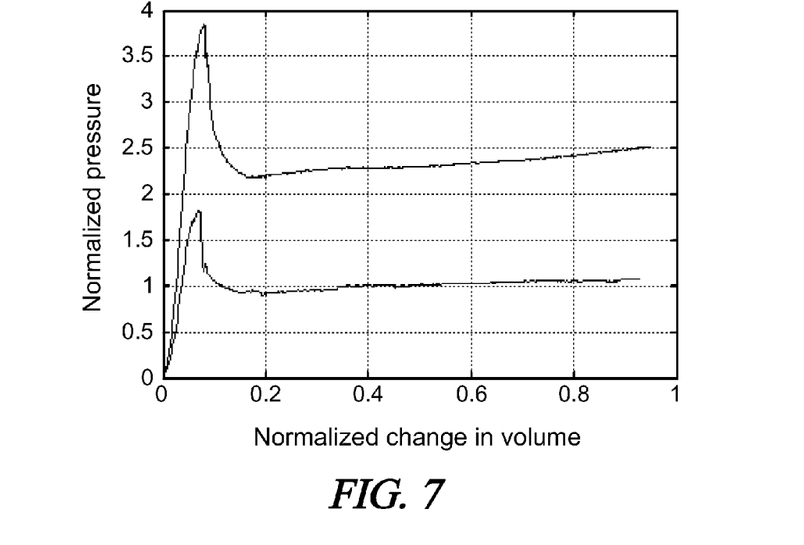
FIG. 7 is a diagram showing the performance of two different embodiments of accumulators described herein. The top curve is the performance of an embodiment of an accumulator system having two accumulators arranged in series. Shown there is the normalized pressure charted against the normalize change in volume. The bottom curve is the performance of an embodiment of an accumulator system having only a single accumulator.

This multiplicative effect of joining elastomeric accumulators in series does not only affect bubble formation pressure, but multiplies the pressure of a single bladder 12 for all levels of volumetric expansion. Shown in FIG. 7 is the PV behavior of the series device 10 system, which has two devices 10 connected in series (top curve), as compared to the single device 10 system, which has one device 10 (bottom curve), normalized with respect to change in system volume and holding pressure. Furthermore, provided the compressive strength of the constituent material is sufficient for the first bladder 12 to not fail due to high compressive load, more accumulator devices 10 can be joined in series to linearly increase the pressure presented to the pump.

ANOTHER EMBODIMENT OF THE INVENTION

Figure 8:
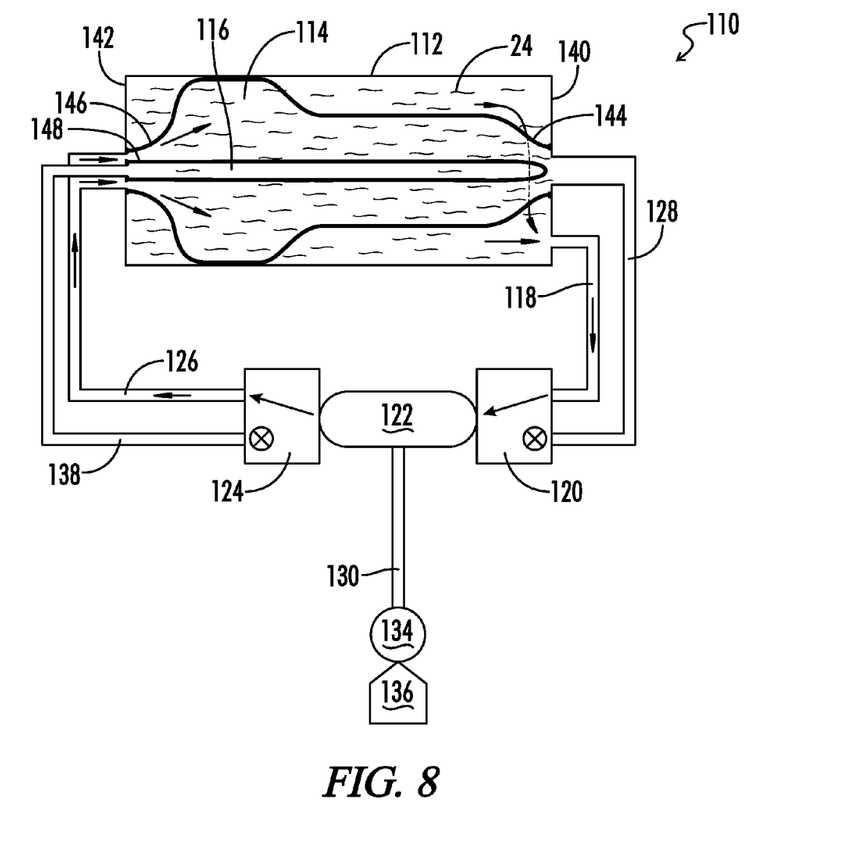

Although the series device 10 system shows that joining accumulator devices 10 in series allows the use of more uniformly strained bladders 12 and 13 without reducing the maximum pressure achievable by the system as a whole, it requires for the system's initial working fluid 24 volume to also be multiplied by approximately the number of accumulator devices 10 to be used. This amount of intermediate fluid 24 can be reduced by "stacking" bladders 114 and 116 together such that the space in between the bladders 114 and 116 (as shown in FIG. 8) contains fluid 24. The embodiment described below expounds this idea. That embodiment describes an extra step of repumping the intermediate fluid 24 through a series of valves.

The embodiment shown in FIGS. 8 and 9, as further described below, achieves similar results with a different emphasis. That embodiment of the present invention also seeks to distribute strain energy within thin walled bladders 114 and 116 to maximize the strain energy density, but with several differences: 1) the embodiment fills bladders progressively instead of filling all bladders simultaneously as in the series configuration described above; and 2) the hydraulic differential pressure of the embodiment described below is maintained as the differential pressure across the bladder currently being filled. If all bladders 114 and 116 are identical, other than the outside bladder 114 being larger, the differential hydraulic pressure from the accumulator side to the reservoir side will be the same with each bladder progressively filled (and would be the same regardless of the number of bladders). With the series configuration embodiment described above, the differential hydraulic pressure from the accumulator side to the reservoir side will be approximately equal to the differential pressure across one of the bladders multiplied by the number of bladders. The primary advantage of the "stacked" embodiment, further described below, is an increase in the systems energy density. Another advantage of the series device 10 system embodiment described above is that the differential hydraulic pressure (from the low pressure side of the hydraulic system to the high pressure side of the system) can be made to exceed the bladder yield stress.

Referring now to FIG. 8, the embodiment shown places a second bladder 116 inside the first bladder 114. If desired, a third bladder (not shown) can be placed inside the second bladder 116 and so on up to some practical limit. The result is an increase in energy that will be stored in a given volume while still being able to optimize the nominal thickness of the bladder material for the operating parameters of the system 110. Still referring to FIG. 8, there is shown a schematic diagram of the embodiment when the first bladder 114 is being expanded within the housing 112. As noted above, working fluid 24 is present throughout the system 110. Since arrows are used to show fluid 24 flow direction, fluid 24 is not shown in the conduits 118, 126, 128, 138, switching valves 120, 124, and pump/motor 122 in FIGS. 8-11. The housing 112 has a first end 140 and a second end 142. The tubular first bladder 114 having a first end 144 and a second end 146. This is essentially no different from the previously described design, except to be consistent with the following steps the fluid 24 is shown taken from the housing 112 which surrounds the first bladder 114, directed by first switching valve 120, which is a two-position, three-way valve, to the input of the pump/motor 122 which receives the mechanical energy to be stored from the attached energy harvesting device 136, for example the wheels of a vehicle that is being decelerated. Then, the output of the pump/motor 122 at higher pressure equal to P1 is directed to the first bladder 114 by a second switching valve, also a two-position three-way valve. Each switching valve is a standard two-position three-way valve, which is readily commercially available and well known to those of ordinary skill in the art. Such switching valves are operated by controllers (not shown) the commercial availability and operation of which are well known to those of ordinary skill in the art. Further, the various conduits used to transport the fluid 24 are conduits which are readily commercially available and well known to those of ordinary skill in the art. Examples of such conduits include stainless steel, or the like. Note that the pump/motor 122 is a variable displacement pump to accommodate the required step up in pressure for a range of torques available from the input shaft 130 to the pump/motor 122, shown connected to a motor 134.

Figure 9:
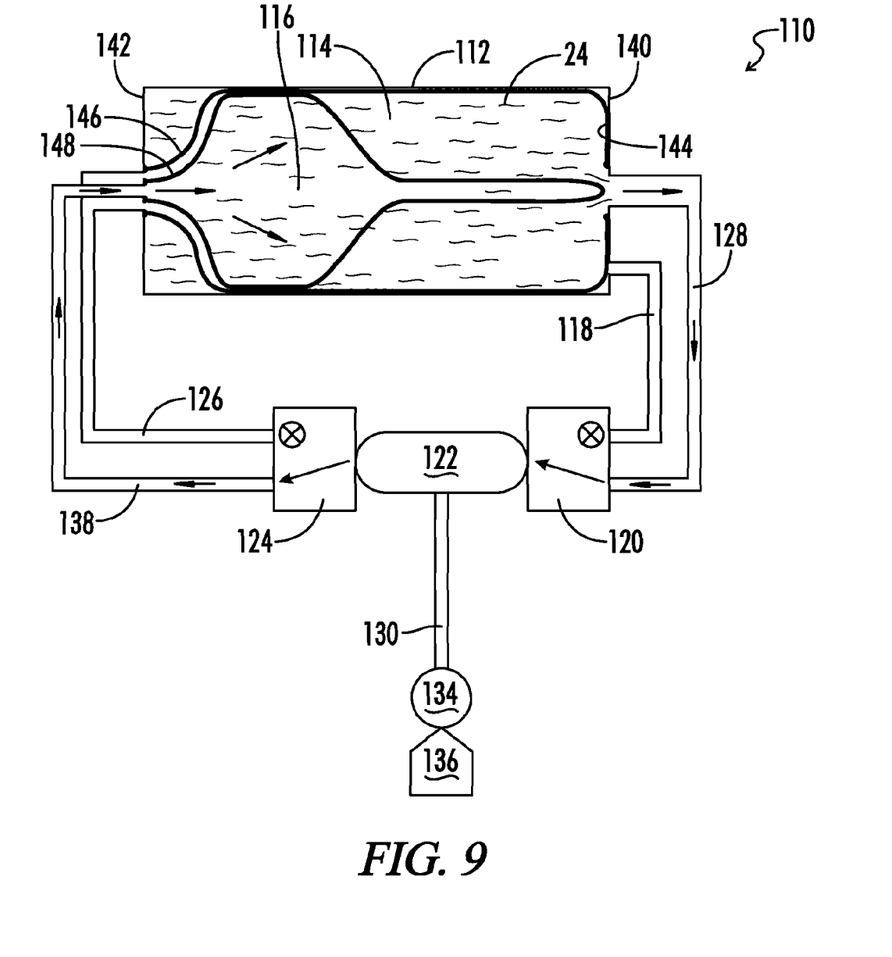

FIG. 9 shows a schematic diagram of operation after the first bladder 114 is fully extended. Next, energy is stored in the second bladder 116. The second bladder 116 having a first end 148. When operating at this phase the first switching valve 120 and second switching valve 124 are directing flow of fluid 24 coming from the first bladder 114 through the third conduit 128, through the fourth conduit 138 and into the second bladder 116. That is, the fluid 24 goes through the pump/motor 122, so that the output of the pump/motor 122 is directed into the second bladder 116. Since high pressure P1 is on the outside of the second bladder 116, the pressure necessary to expand the second bladder 116 is P1+P2. However the pressure boost that the pump/motor 122 must provide need not change, assuming the bladder is appropriately designed. This is because the pump/motor 122 input is at pressure P1 already. Furthermore, the pressure that must be resisted by the second bladder 116 is also only the difference in the inner and outer pressure, which is P1+P2−P1=P2.

Figure 10:
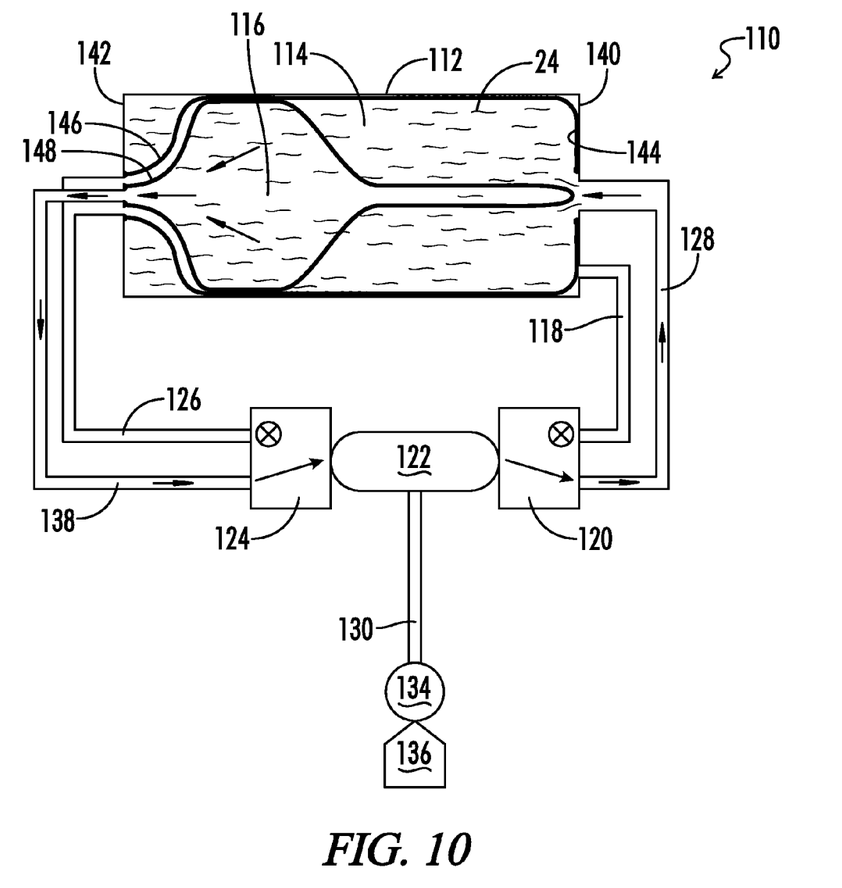
FIG. 10 is a schematic diagram showing the release of the stored energy from the embodiments of the "stacked" accumulator shown in FIG. 8. The inner bladder is releasing its fluid and as the fluid flows out, it is being used by the pump/motor to perform work through the shaft. The arrows show the direction of flow of the working fluid during release of energy from the embodiment of the accumulator system.
Figure 11:
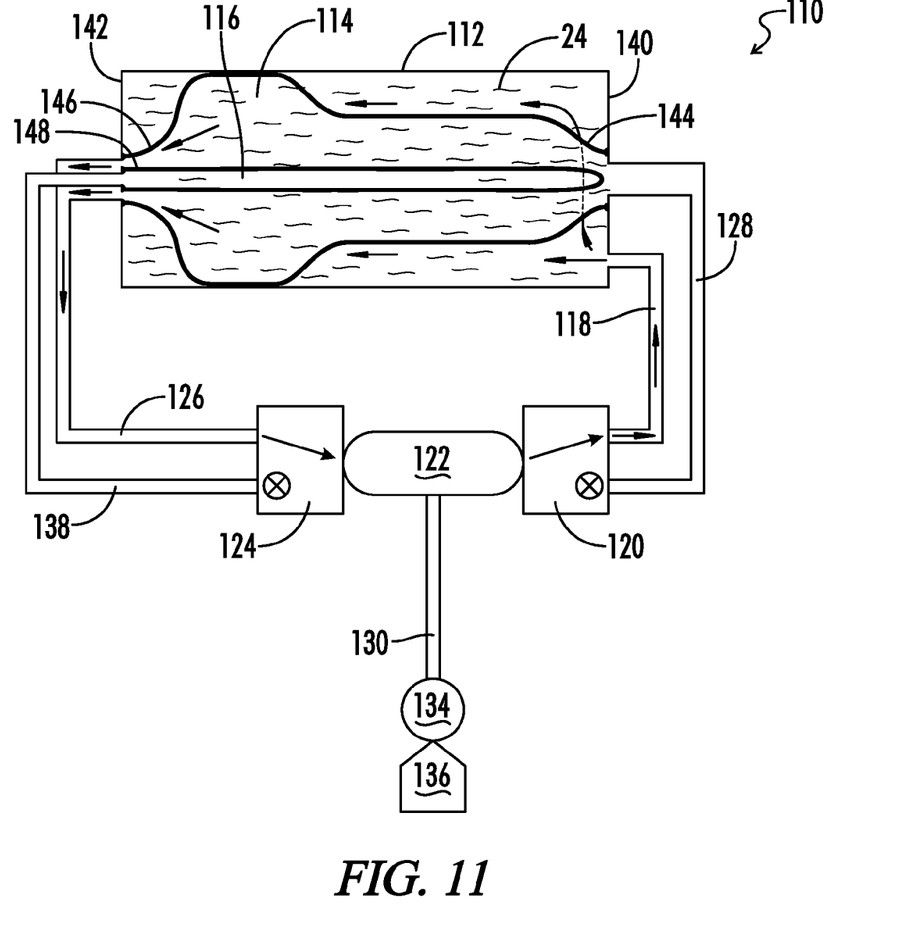

Referring now to FIGS. 10 and 11, there is shown the reverse of fluid 24 flow as compared to FIGS. 8 and 9. Shown in FIG. 10 is a schematic diagram at a point in time after the system 110 is fully charged and the direction of fluid 24 flow is reversed. The second bladder 116 forces fluid 24 through conduit 38 and the second switching valve 124 to the pump/motor 122. The pump/motor 122 uses the fluid 24 flow to perform work through the shaft 130. Referring now to FIG. 11, after the second bladder 116 returns to an unstrained configuration, fluid 24 within the first bladder 114 is forced through conduit 126 and the second switching valve 124 to the pump/motor 122 so that the fluid 24 flow is used to perform work through the shaft 130.

If a third bladder (not shown) is placed inside the second bladder 116, the complexity grows but in a linear manner. In such an embodiment, the first switching valve 120 and the second switching valve 124 are four-way, three-position valves. Such switching valves are readily commercially available and well known to those of ordinary skill in the art. The pressure rating of some components must continue to rise. There will also be a point of diminishing returns as the inside of the various bladders becomes filled with other bladders. In the limiting case, two bladders will hold up to twice as much energy and three bladders will hold up to three times as much energy as a single bladder of the same dimension.

The material of construction of elastomeric material that may be used for the bladders described herein is readily commercially available and well known to those of ordinary skill in the art. Also, methods and processes for shaping and molding such elastomeric material are well known and readily commercially available. Examples of such elastomeric materials include polyurethane, natural rubber, nitrile rubber or another engineered elastomer or material which is suitable as known to those of ordinary skill in the art. Regarding the dimensions and size of the elastomeric material, in certain embodiments, it may have the shape of a long slender tubular bladder having two open ends or one open end and one closed.

In certain embodiments of the present invention, the material of construction of the rigid shroud 14 and 112, also called the housing, is a rigid structural material capable of withstanding the pressures described herein, and providing fluid tight containment of the fluid 24. Those of ordinary skill in the art are familiar with such materials, which are readily commercially available. Methods of fabricating a housing 14 and 112 of any such material are well known to those of ordinary skill in the art, and such fabrication services are readily commercially available. For example, in certain embodiments of the present invention, the housing 14 and 112 is constructed of steel, carbon fiber, polycarbonate, woven pressure vessel materials, fiberglass, aluminum, or the like. As known to those of ordinary skill in the art, the invention disclosed herein is scalable to accomplish the magnitude of desired energy storage.

Regarding attachment of fluid conduits 16, 18, 22, 118, 126, 128 and 138, they may be constructed of any material which is proper for the use and function described herein. Examples of such conduits are well known to those of ordinary skill in the art, and include hydraulic hose, hydraulic piping, or the like. In certain embodiments, connecting the fluid conduits to the pump/motor 20 or 122 includes standard fluid tight connections known to those of ordinary skill in the art, which are well known and readily commercially available. Connectors for providing such junctions are well known to those of ordinary skill in the art and the materials needed for the same are readily commercially available.

This patent application expressly incorporates by reference all patents, references, and publications disclosed herein.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. An accumulator system comprising:
 a housing having a first end and a second end;
 a first bladder having a tubular configuration attached to the first end and the second end of the housing;
 a second bladder having a tubular configuration and a closed end, the second bladder being located within the first bladder and attached to the second end of the housing;
 a first conduit attached to the first end of the housing on the outside of the first bladder;
 a first switching valve attached to the first conduit;
 a pump/motor attached to the first switching valve;
 a second switching valve attached to the pump/motor;
 a second conduit attached to the second switching valve and attached to the second end of the housing at a position which is inside of the first bladder and outside of the second bladder;
 a third conduit attached to the first end of the housing at a position to the inside of the first bladder and attached to the first switching valve;
 a fourth conduit attached to the second switching valve and attached to the second end of the housing at a position which is inside of the second bladder.

2. The accumulator system of claim 1, further comprising:
a shaft attached to the pump/motor;
a motor attached to the shaft.

3. The accumulator system of claim 1, further comprising a fluid contained within the housing, first bladder, second bladder and each of the conduits.

4. The accumulator system of claim 1, wherein the first switching valve and the second switching valve are two position three way valves.

5. An accumulator, comprising:
a first bladder having a tubular configuration with two open ends;
a second bladder stacked within the first bladder, the second bladder having a closed end and an open end;
a housing having a first end and a second end, the housing surrounding the first bladder and second bladder;
wherein the first end and the second end of the housing are attached to the open ends of the first bladder;
wherein the second end of the housing is attached to the open end of the second bladder.

6. The accumulator of claim 5, further comprising:
a first switching valve operationally attached to the first end of the housing;
a pump/motor operationally attached to the first switching valve;
a second switching valve operationally attached to the pump/motor and operationally attached to the second end of the housing.

7. The accumulator of claim 6, wherein the second bladder is a length of the housing.

8. The accumulator of claim 6, wherein the first end and the second end of the housing each define a plurality of openings.

9. The accumulator of claim 8, further comprising a fluid between each of the bladders and surrounding the bladders within the housing.

10. An accumulator system, comprising:
a first accumulator, wherein the first accumulator has a low pressure side and a high pressure side;
a second accumulator, wherein the second accumulator has a low pressure side and a high pressure side, wherein the low pressure side of the first accumulator is attached to the high pressure side of the second accumulator;
a pump/motor attached to the low pressure side of the second accumulator and the high pressure side of the first accumulator.

11. The accumulator system of claim 10, further comprising a plurality of accumulators, wherein each of the plurality of accumulators has a low pressure side and a high pressure side, wherein each of the plurality of the accumulators is operationally attached in a series configuration at a position between the low pressure side of the second accumulator and the pump/motor.

12. The accumulator system of claim 10, further comprising:
a third accumulator having a low pressure side and a high pressure side;
a fourth accumulator, wherein the fourth accumulator has a low pressure side and a high pressure side, wherein the low pressure side of the third accumulator is attached to the high pressure side of the fourth accumulator and the pump/motor is attached to the low pressure side of the fourth accumulator and the high pressure side of the third accumulator.

13. A method of manufacturing an accumulator system having a desired working pressure and working volume of fluid, comprising:
providing a plurality of accumulators, each accumulator having a low pressure side and a high pressure side;
providing a pump/motor;
attaching the pump/motor to the plurality of accumulators so that the plurality of accumulators are attached in series and in parallel, wherein each accumulator acts on a differential pressure between its high pressure side and its low pressure side;
incorporating additional accumulators in series in order to increase the working pressure of the accumulator system;
incorporating additional accumulators in parallel in order to increase the working volume of the accumulator system.

\* \* \* \* \*